UNITED STATES PATENT OFFICE.

GEORGE SEILER, OF SPRING FORGE, PENNSYLVANIA.

PROCESS OF PURIFYING WATER.

SPECIFICATION forming part of Letters Patent No. 275,277, dated April 3, 1883.

Application filed February 1, 1883. (No specimens.)

*To all whom it may concern:*

Be it known that I, GEORGE SEILER, a citizen of the United States, residing at Spring Forge, in the county of York and State of Pennsylvania, have invented certain new and useful Improvements in Processes for Purifying Water; and I do declare the following to be a full, clear, and exact description of the invention, such as will enable others skilled in the art to which it appertains to make and use the same.

My invention relates to a method of purifying water by precipitating the foul matter contained therein; and the novelty consists in the manner of accomplishing that object and the adaptation of the process to paper or paper-pulp mills, as will be more fully hereinafter set forth, and specifically pointed out in the claims.

Paper-mills or paper-pulp mills are ordinarily located upon the banks of a creek, brook, or run. Large tanks are employed, in which a solution of caustic soda is made by adding lime to sodium carbonate in the usual way. This solution is employed to bleach the ground wood, straw, or rags to remove the coloring-matter, dirt, filth, &c. The solution, after having been in contact with such substances for a sufficient time, is drawn off and allowed to run to waste in the brook, creek, or river, carrying with it the filth and coloring-matter which has been liberated from the substances treated. The chemicals described, together with the coloring-matter, tend to befoul the water in the brook, creek, or run for miles in its passage, thus rendering it useless to the farmers whose lands are located upon its line of travel, and injurious, if not poisonous, to cattle, fish, &c.

To obviate this objection this invention is designed, and to this end I use the heavier portions of the chemicals mentioned—that is to say, the precipitated residuum obtained in preparing the caustic-soda solution—remove it to a separate tank provided with a stirrer located adjacent to the outlet or outflow from the bleaching tank or tanks, and, adding sufficient water in proper proportions to make it flow readily, inject the mixture made thereby into the outflowing solution from the bleaching-tanks which is charged with the said coloring, or filth, or bark. This precipitating-mixture is kept in constant commotion and agitation by any proper stirrer operated by any suitable power, preferably some power employed for other purposes in the mill, in order to prevent too rapid precipitation of the lime-sludge, which serves to gather up and hold the coloring-matter and filth in the water, and even the chemical impurities flowing from the bleaching-tank, and to precipitate them to the bottom of stream, close to the mill, leaving the water pure and healthy, and capable of being used for ordinary purposes.

While the invention is described as applied to paper-mill runs, it is obvious that it may be employed in other places with efficiency and economy, and generally to purify filthy or muddy water.

What I claim as new is—

1. The process herein described for purifying the water which has been employed in bleaching, consisting in treating the waste bleaching solution with the precipitated chemicals or lime-sludge resulting from making the said solution, as set forth.

2. The process herein described for purifying the waste bleaching solution of paper-pulp mills, consisting in treating said solution with the precipitated residuum or lime-sludge arising from the manufacture of said bleaching solution, whereby the agitated residuum mentioned takes up and precipitates the filth and coloring-matter contained in such outflow, as and for the purpose set forth.

In testimony whereof I affix my signature in presence of two witnesses.

GEORGE SEILER.

Witnesses:
JOSEPH FORREST,
H. I. BERNHARD.